United States Patent
Buss et al.

(10) Patent No.: US 10,290,060 B2
(45) Date of Patent: May 14, 2019

(54) SYSTEMS, METHODS, AND APPARATUS FOR OBJECT CLASSIFICATION BASED ON LOCALIZED INFORMATION

(71) Applicant: The Travelers Indemnity Company, Hartford, CT (US)

(72) Inventors: Eamonn R. Buss, Stewartstown, PA (US); Matthew C. Durlin, Etters, PA (US); Brandon M. Wilson, Hanover, PA (US); Nehal B. Gandhi, South Windsor, CT (US)

(73) Assignee: The Travelers Indemnity Company, Hartford, CT (US)

( * ) Notice: Subject to any disclaimer, the term of this patent is extended or adjusted under 35 U.S.C. 154(b) by 299 days.

(21) Appl. No.: 14/582,064

(22) Filed: Dec. 23, 2014

(65) Prior Publication Data

US 2016/0180468 A1 Jun. 23, 2016

(51) Int. Cl.
| | |
|---|---|
| *G06Q 40/08* | (2012.01) |
| *G06F 17/30* | (2006.01) |
| *G06Q 50/16* | (2012.01) |
| *G06K 9/00* | (2006.01) |
| *G06K 9/22* | (2006.01) |

(52) U.S. Cl.
CPC ....... *G06Q 40/08* (2013.01); *G06F 17/30268* (2013.01); *G06F 17/30598* (2013.01); *G06K 9/00664* (2013.01); *G06K 9/00684* (2013.01); *G06K 9/00691* (2013.01); *G06K 9/22* (2013.01); *G06Q 50/16* (2013.01)

(58) Field of Classification Search
CPC ....................................................... G06Q 50/16
USPC ............................................................ 705/4
See application file for complete search history.

(56) References Cited

U.S. PATENT DOCUMENTS

| | | | |
|---|---|---|---|
| 9,253,349 B2 | 2/2016 | Amtrup et al. | |
| 9,280,793 B2 | 3/2016 | English et al. | |
| 2011/0161117 A1* | 6/2011 | Busque | G06Q 40/08 705/4 |
| 2013/0013344 A1 | 1/2013 | Ernstberger et al. | |
| 2013/0013345 A1 | 1/2013 | Wallquist et al. | |
| 2014/0304178 A1* | 10/2014 | Bengson | G06Q 50/16 705/313 |

* cited by examiner

*Primary Examiner* — Robert R Niquette
*Assistant Examiner* — Liz P Nguyen
(74) *Attorney, Agent, or Firm* — Michael D. Downs; Fincham Downs LLC

(57) ABSTRACT

Systems, apparatus, methods, and articles of manufacture provide for image analysis using localized information. In one embodiment, an object (e.g., content of a building or other type of property) may be classified by determining the type of object and determining classification information associated with previously classified objects of the same type and associated with the same geographical area.

26 Claims, 13 Drawing Sheets

SYSTEMS, METHODS, AND APPARATUS FOR OBJECT CLASSIFICATION BASED ON LOCALIZED INFORMATION

BACKGROUND

Image recognition systems are known for identifying objects in electronic images (e.g., in digital photographs). Some types of image recognition systems may use location information to identify particular unique structures, landmarks, and the like in an image (e.g., to identify Mount Rushmore National Memorial in an image known to have been taken near Mount Rushmore National Memorial).

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
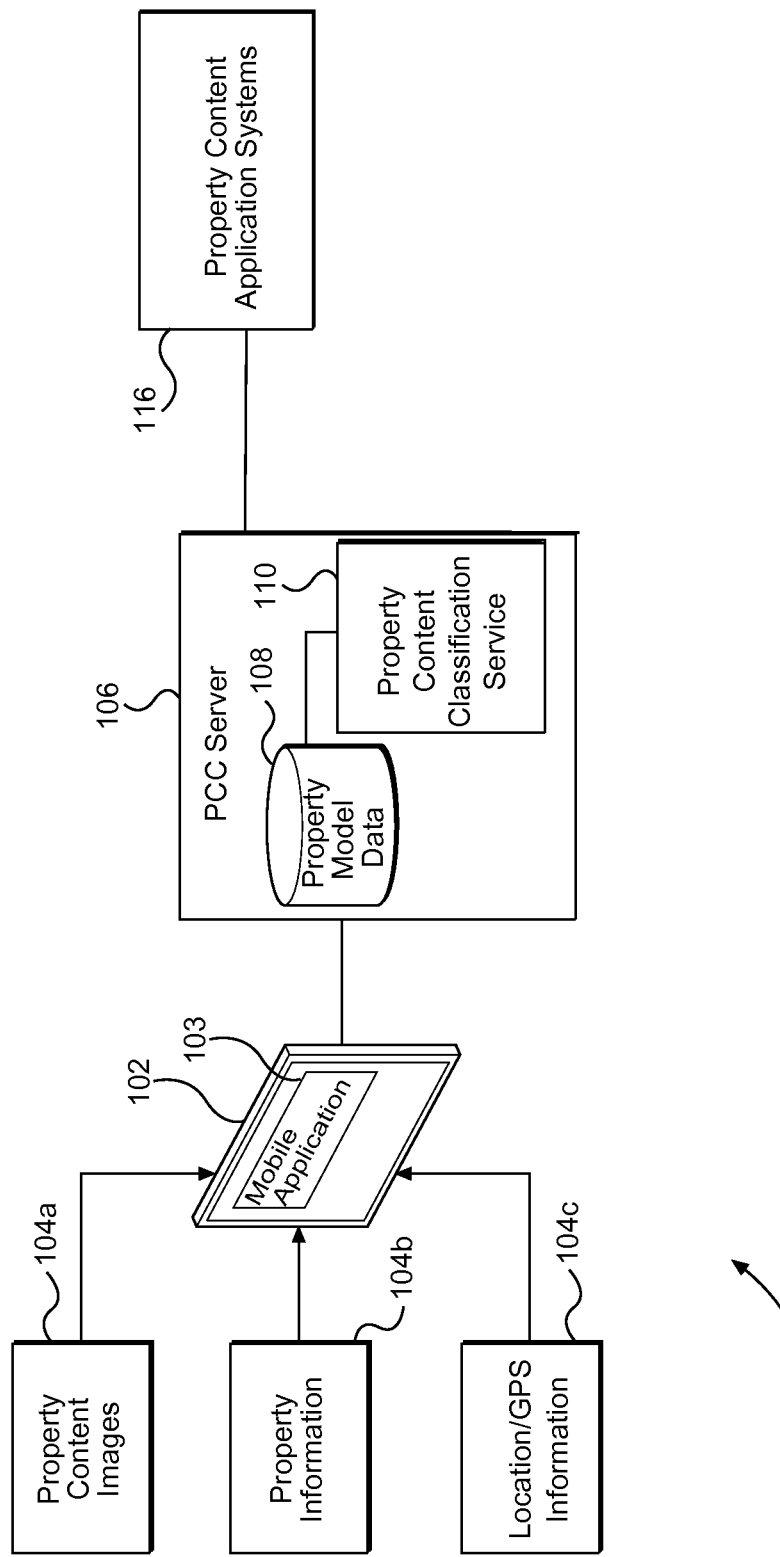
FIG. 1 is a diagram of a system according to an embodiment of the present invention.

This disclosure relates to systems, methods, and apparatus for determining information about content, inventory, and other objects associated with a property or location (e.g., a physical building or other physical location). According to some embodiments, property and/or objects may be classified based on localized information, such as information associated with other property and/or other objects within the same geographical area as a first property or first object.

In accordance with some embodiments of the present invention, one or more systems, apparatus, methods, articles of manufacture, and/or computer readable media (e.g., non-transitory computer readable memory storing instructions for directing a processor) provide for one or more of:

a) determining a geographical location of a first property;
b) determining property information for the first property;
c) determining at least one similar property based on the geographical location and the property information;
d) determining content information for the at least one similar property; and/or
e) determining content information for the first property based on the content information for the at least one similar property.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used in this disclosure, the term "property" refers to a uniquely defined physical or geographical area or space, physical location, building, or other type of real estate. Accordingly, "property" is associated with a geographical location, and may be associated with a residence or business.

As used in this disclosure, the term "object" refers to a specific person or thing. "Object type" and "type of object" may be used synonymously to refer an associated category or other common characteristic that may be shared by multiple objects. In some embodiments, as discussed in more detail in this disclosure, a particular property may be associated with one or more objects. Such objects may be referred to in this disclosure as "content" or "property content" that is at, of, or otherwise associated with a particular property. In contrast to the term "property," described above, the term "personal property" as used in this disclosure refers to objects that are things, but not to persons. The content of a particular property may include personal property, and accordingly the content or personal property is associated with a particular geographical location. For example, various types of objects may be found in a home, store, building, park, or other property, and some of the objects may be personal property associated with that property.

As used in this disclosure, the term "image" refers to a visual representation of an object or scene (e.g., including more than one object). The terms "digital image" or "electronic image file" may be used synonymously in this disclosure, and refer to images that are electronically transmissible, computer- or machine-readable, and/or computer- or machine-storable (e.g., one or more electronic files storing a digital image).

FIG. 1 is a diagram illustrating one or more embodiments of the present invention. More specifically, FIG. 1 shows an example property content classification system 100 for identifying, classifying, and applying information about property content. Specifically, the property content classification system 100 may provide for determining information about a particular property, including geographical information associated with the property and information (e.g., images) describing the content of the property; classifying the property and/or the content of the property; and/or utilizing the property content classification information in one or more property content application systems.

As shown in FIG. 1, the property content classification system 100 may comprise a mobile device 102 (e.g., a tablet computer, a smartphone, or other type of portable computing device) in communication with a property content classification (PCC) server 106, which may be in communication with one or more property content application systems 116.

As shown in FIG. 1, the mobile device 102 may store and/or execute one or more types of mobile applications 103 (e.g., software applications executed by a processor) for receiving and processing various types of information, including, but not limited to, property content images 104*a*, property information 104*b*, and location/global positioning system (GPS) information 104*c*. In some embodiments, the mobile device 102 may be operated by a user located at a particular property (e.g., an office building) who wants to identify and/or classify various types of objects at the particular property. In one embodiment, the mobile device 102 and/or mobile application 103 provide a front end with GPS capability to a user, allowing the user to receive property content classification information while on site at a particular property (e.g., remote from a facility housing PCC server 106). In some embodiments, the user may be able to add, modify, or delete property content classification information via the mobile device 102.

The mobile device 102 may, for example, comprise one or more Personal Computer (PC) devices, computer workstations (e.g., underwriter workstations), tablet computers such as an iPad® manufactured by Apple®, Inc. of Cupertino, Calif., and/or cellular and/or wireless telephones such as an iPhone® (also manufactured by Apple®, Inc.) or a G3™ smart phone manufactured by LG® Electronics, Inc. of San Diego, Calif., and running the Android® operating system from Google®, Inc. of Mountain View, Calif.

As shown in FIG. 1, the PCC server 106 (which may be remote from the mobile device 102) may comprise property model data 108 and property content classification service 110 (e.g., a web-based service implemented using SoapUI™ by SmartBear, TomEE+™ by Apache, Eclipse™ by The Eclipse Foundation, or the like). According to some embodiments, the property content classification service 110 receives a request for property classification information from the mobile device 102 (e.g., the request including one or more of property content images 104*a*, property information 104*b*, location/GPS information 104*c*) and classifies content of the property based on the information received from the mobile device 102 and based on the stored property model data 108. The property content classification service 110 may, for example, determine object-specific information associated with one or more objects at a first property (e.g., from which the mobile device 102 is in communication with the property content classification service 110). Classifying content may comprise image recognition in order to identify objects in images from the property and classifying the property (e.g., by comparing the property to other properties in the same geographical area). Some additional details about property and object classification are discussed in this disclosure.

In some embodiments, the PCC server 106 may comprise an electronic and/or computerized controller device such as a computer server communicatively coupled to interface with at least one mobile device (e.g., mobile device 102) and/or one or more property content application systems 116 (directly and/or indirectly). The PCC server 106 may, for example, comprise one or more PowerEdge™ M910 blade servers manufactured by Dell®, Inc. of Round Rock, Tex. which may include one or more Eight-Core Intel® Xeon® 7500 Series electronic processing devices. According to some embodiments, as described in this disclosure, the PCC server 106 may be located remote from one or more mobile devices. The PCC server 106 may also or alternatively comprise a plurality of electronic processing devices located at one or more various sites and/or locations.

According to some embodiments, the property content classification service 110 may store and/or execute specially programmed instructions to operate in accordance with embodiments described in this disclosure. According to some embodiments, the PCC server 106 may comprise a computerized processing device such as a PC, laptop computer, computer server, and/or other electronic device to store property model data 108 and the property content classification service 110 and to execute the property content classification service 110 (e.g., on request of a mobile device 102) to manage and/or facilitate communications with the mobile device 102.

As explained in more detail below with respect to particular embodiments, property model data 108 may comprise information about one or more properties, physical locations, and/or areas that may be useful in classifying other properties and/or physical locations, and may be useful, in accordance with some embodiments, for classifying various types of objects at a particular property based on information about objects at a different property. In some embodiments, the property model data 108 may be gathered as raw data directly from one or more data sources. In some embodiments, the property model data 108 may be stored at and/or accessible from an external and/or third party data source.

In some embodiments, property model data 108 may comprise information indicative of land and/or building (and/or other structure or object) characteristics of a single property, or may comprise information indicative of land and/or building (and/or other structure or object) characteristics of a plurality of properties and/or areas and/or types of objects and/or areas. The property model data 108 may, for example, be descriptive of data from a third-party data source and/or may comprise federal, state, regional, private, town/local, and/or municipal data reports providing characteristic data about various residences, business locations, open spaces, and/or other types of properties. The property model data 108 may comprise, in some embodiments, various private, public, municipal, and/or derived or empirical data descriptive of one or more characteristics of a building and/or other structure or object. According to some embodiments, the property model data may identify what the uses (e.g., business operation type, such as indicated by an applicable Standard Industrial Classification (SIC) code) and/or contents of the properties are (e.g., a number of residents and/or employees of a business; a number of stairwells, fire exits, and/or elevators; and/or types of inventory and/or equipment).

According to some embodiments, the PCC server 106 may execute specially programmed instructions to process one or more of property content images 104*a*, property information 104*b*, location/GPS information 104*c*, based on the property model data 108, to classify a property (e.g., a property at the location of the mobile device 102) and/or to classify one or more objects at the property (and/or to recommend that one or more types of objects or object classifications be associated with the property).

As shown in FIG. 1, the PCC server 106 may be in communication with and may transmit property content classification information (e.g., determined via property content classification service 110) to the mobile device 102 and/or to one or more types of property content application systems 116. In some embodiments, property content application systems 116 may include one or more of a mapping application system, a security application system, an augmented reality application system, a virtual reality application system, an inventory application system, and an insurance policy application system. For instance, property content classification information describing the objects at a particular building may be used to generate a map of the building, to analyze a security status of objects in the building, generate or model content for an augmented or virtual reality environment, maintain a content inventory for the building, and/or develop an insurance coverage profile for the contents of the building.

Any or all of the devices depicted in FIG. 1 may be in communication via one or more electronic communication networks. A network may, according to some embodiments, comprise a Local Area Network (LAN; wireless and/or wired), cellular telephone, Bluetooth®, and/or Radio Frequency (RF) network with communication links between the mobile device 102, the PCC server 106, and/or the property content application systems 116. In some embodiments, a network may comprise direct communications links between any or all of the components of the system 100. In some embodiments, the network may comprise one or many other links or network components allowing for communication among the devices depicted in FIG. 1. The mobile device 102 may, for example, be connected to the PCC server 106 via various cell towers, routers, repeaters, ports, switches, and/or other network components that comprise the Internet and/or a cellular telephone (and/or Public Switched Telephone Network (PSTN)) network, and which comprise portions of an electronic communication network. A communications network may comprise any number, type, and/or configuration of networks that is or becomes known or practicable. According to some embodiments, a network may comprise a conglomeration of different sub-networks and/or network components interconnected, directly or indirectly, by the components of the system 100. The network may comprise one or more cellular telephone networks with communication links between the mobile device 102 and the PCC server 106, for example, and/or may comprise the Internet, with communication links between the PCC server and the property content application systems 116, for example.

Figure 2:
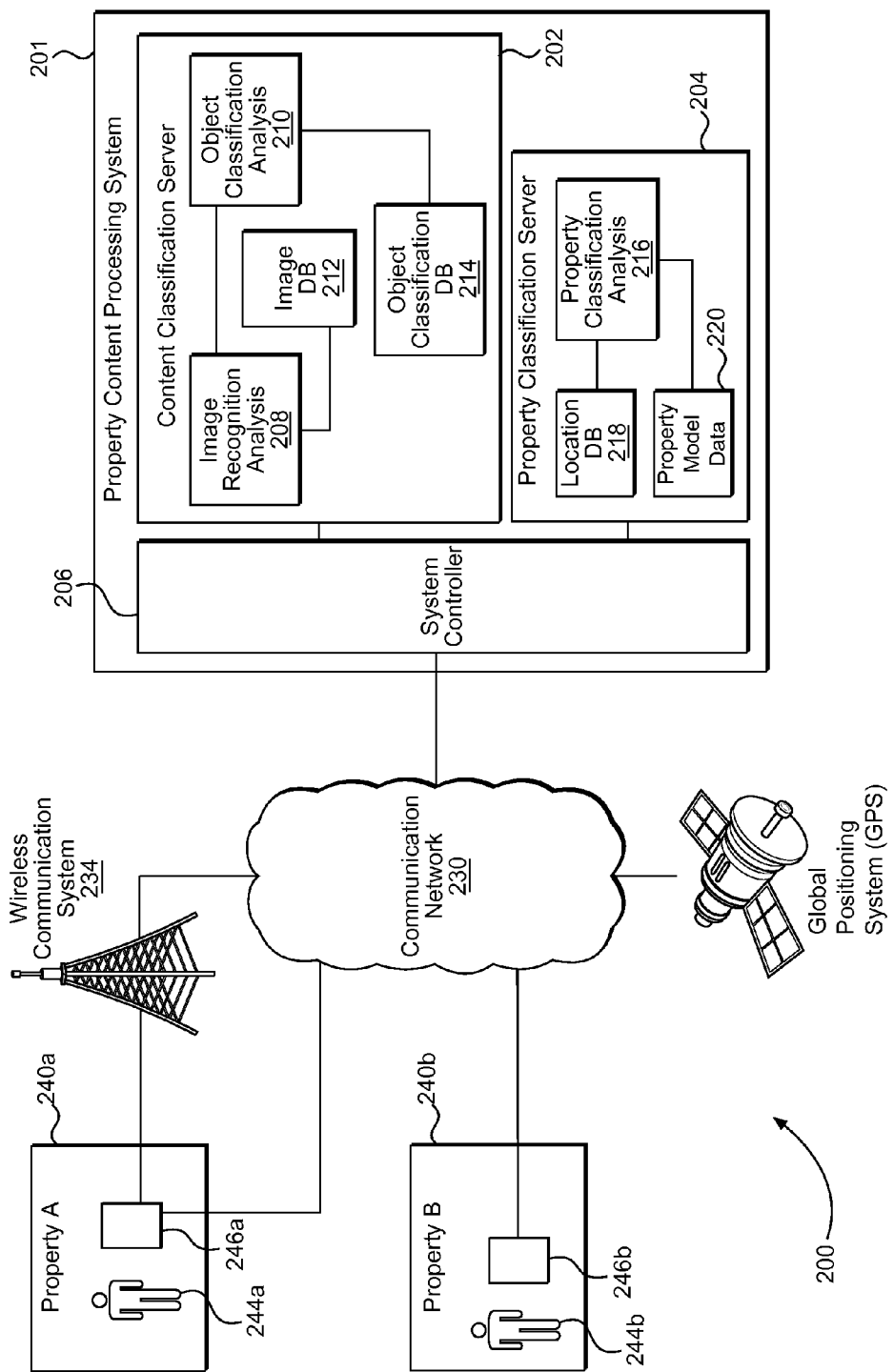
FIG. 2 is a diagram of a system according to an embodiment of the present invention.

FIG. 2 is a diagram illustrating one or more embodiments of the present invention. More specifically, FIG. 2 shows another example property content classification system 200 for identifying and classifying property content. Specifically, the property content classification system 200 may provide for determining information about a particular property, including geographical information associated with the property and information (e.g., images) describing content of the property; classifying the property and/or classifying content of the property; and/or utilizing the property content classification information in one or more property content application systems (not depicted in FIG. 2).

As shown in FIG. 2, the property content classification system 200 may comprise a first property (Property A) 240a and a second property (Property B) 240b. As depicted in FIG. 2, a respective user 244a, 244b is at each property with a respective mobile device 246a, 246b. Each of the mobile devices 246a, 246b is in communication with a property content processing system 201, which comprises a content classification server 202, a property classification server 204, and a system controller 206.

Any two or more of the various devices depicted in property content classification system 200 may be in communication with each other via at least one of communication network 230 and wireless communication 234. As also depicted in FIG. 2, GPS 232 may provide geographical location information to the mobile devices 246a, 246b, wireless communication system 234, and/or one or more portions of property content processing system 201. As described with respect to various embodiments, localized information may be utilized for classifying objects (e.g., captured in digital images) and/or classifying businesses and other types of properties, and may be used in identifying properties and/or objects that are geographically proximate to a particular property and/or object.

As shown in FIG. 2, the content classification server 202 may comprise image recognition analysis instructions 208 for conducting an image recognition analysis of images, image DB 212 (e.g., containing stored object image data for comparing with images received from mobile devices 246a, 246b), object classification analysis instructions 210, and object classification DB 214. Object classification analysis instructions 210 may store instructions for classifying and/or determining classification information (e.g., object type information, object valuation information) for one or more objects, based on the object classification DB 214 (e.g., containing stored historical object classification data for a plurality of previously classified objects).

As shown in FIG. 2, the property classification server 204 may comprise property classification analysis instructions 216 for classifying a particular property (e.g., Property A 240a) by comparing the geographical location of the property with respective geographical location data for a plurality of properties stored in location DB 218 in order to identify one or more nearby properties and/or by comparing property information about the property with the property model data 220 (e.g., including respective property detail information for a plurality of properties) in order to determine one or more properties similar to the particular property (e.g., associated with a similar type of business).

Figure 3:
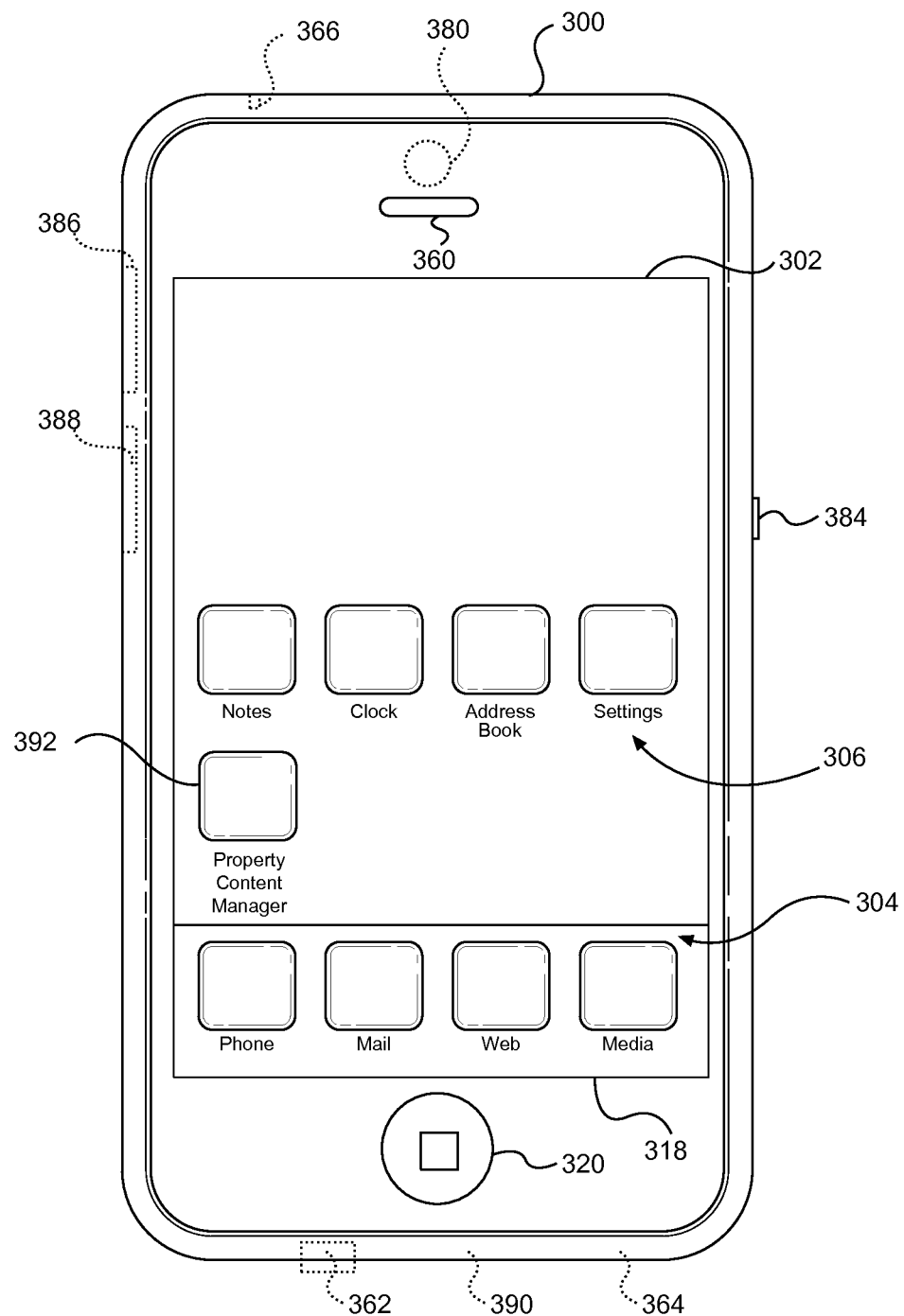
FIG. 3 is a diagram of a mobile device according to an embodiment of the present invention.

Turning to FIG. 3, a block diagram of an example mobile device 300 according to some embodiments is shown. In some embodiments, the mobile device 300 comprises a display 302. The display may be implemented with liquid crystal display (LCD) technology, light emitting polymer display (LPD) technology, or some other display technology. The display 302 may be a touch-sensitive display that is sensitive to haptic contact and/or tactile contact by a user. Alternately or in addition, other touch-sensitive display technologies may be used, such as, without limitation, a display in which contact is made using a stylus or other pointing device.

In some embodiments, the mobile device 300 may be adapted to display one or more graphical user interfaces on a display (e.g., display 302) for providing the user access to various system objects and/or for conveying information to the user. In some embodiments, the graphical user interface may include one or more display objects 304, such as icons or other graphic representations of respective system objects. Some examples of system objects include, without limitation, device functions, applications, windows, files, alerts, events, or other identifiable system objects.

In some embodiments, the mobile device 300 can implement multiple device functionalities, such as a telephony device, an e-mail device, a network data communication device, a Wi-Fi base station device, and a media processing device. In some embodiments, particular display objects 304 can be displayed in a menu bar 318. In some embodiments, device functionalities can be accessed from a top-level graphical user interface, such as the graphical user interface illustrated in FIG. 3. Touching one of the display objects can, for example, invoke corresponding functionality. For example, touching a display object for an email application would invoke the email application on the mobile device 300 for sending email messages.

In some embodiments, upon invocation of device functionality, the graphical user interface of the mobile device 300 changes, or is augmented or replaced with another user interface or user interface elements, to facilitate user access to particular functions associated with the corresponding device functionality. For example, in response to a user touching a phone object, the graphical user interface of the display 302 may present display objects related to various phone functions. Likewise, touching of an email object may cause the graphical user interface to present display objects related to various email functions; touching a Web object may cause the graphical user interface to present display objects related to various Web-surfing functions; and touching a media player object may cause the graphical user interface to present display objects related to various media processing functions. In some embodiments, the top-level graphical user interface environment or state of FIG. 3 can be restored by pressing a button 320 of the mobile device 300.

In some embodiments, the top-level graphical user interface may include display objects 306, such as a notes object, a clock object, an address book object, a settings object, and/or one or more types of display objects having corresponding respective object environments and functionality. Touching the example "Property Content Manager" object 392 may, for example, invoke a location services environment, property content classification services environment, and/or one or more property content application services environments (e.g., an insurance coverage application service), and supporting functionality, as described in this disclosure with respect to various embodiments. A selection of any of the display objects may invoke a corresponding object environment and functionality.

In some embodiments, the mobile device 300 can include one or more input/output (I/O) devices and/or sensor devices. For example, a speaker 360 and a microphone 362 can be included to facilitate voice-enabled functionalities, such as phone, voicemail, or recorded audio functions. In some embodiments, an up/down button 384 for volume control of the speaker 360 and the microphone 362 can be included. In some embodiments, a loud speaker 364 can be included to facilitate hands-free voice functionalities, such as speaker phone functions. An audio jack 366 can also be included for use of headphones and/or a microphone.

In some embodiments, the mobile device 300 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some embodiments, a positioning system (e.g., a GPS receiver) can be integrated into the mobile device 300 (e.g., embodied as a mobile type of user device, such as a tablet computer or smartphone) or provided as a separate device that can be coupled to the mobile device 300 through an interface to provide access to location-based services.

In some embodiments, a port device 390, e.g., a Universal Serial Bus (USB) port, or a docking port, or some other wired port connection, can be included. The port device 390 can, for example, be utilized to establish a wired connection to other computing devices, such as other communication devices 300, network access devices, a personal computer, a printer, a display screen, or other processing devices capable of receiving and/or transmitting data. In some embodiments, the port device 390 allows the mobile device 300 to synchronize with a host device using one or more protocols, such as, for example, the TCP/IP, HTTP, UDP and any other known protocol.

The mobile device 300 can also include a camera lens and sensor 380. In some embodiments, the camera lens and sensor 380 can be located on the back surface of the mobile device 300. The camera can capture still images and/or video.

The mobile device 300 can also include one or more wireless communication subsystems, such as an 802.11b/g communication device 386, and/or a Bluetooth™ communication device 388. Other communication protocols can also be supported, including other 802.x communication protocols (e.g., WiMax, Wi-Fi, 4G), code division multiple access (CDMA), global system for mobile communications (GSM), Enhanced Data GSM Environment (EDGE), etc.

Figure 4:
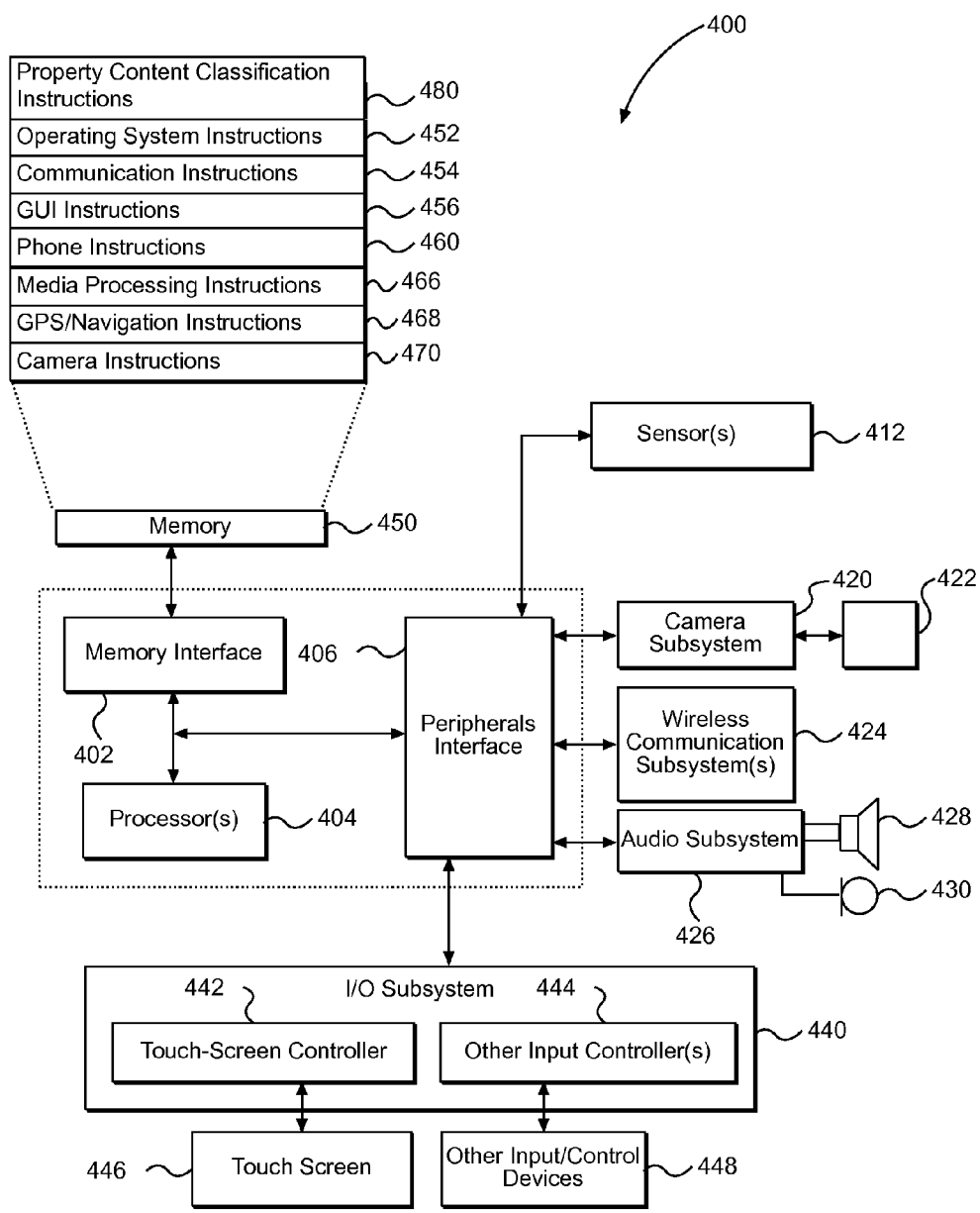
FIG. 4 is a diagram of a mobile device architecture according to an embodiment of the present invention.

FIG. 4 is a block diagram of an example architecture 400 for the mobile device of FIG. 3. The mobile device 300 may include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the mobile device 300 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate the orientation, lighting, and proximity functions described with respect to FIG. 3. Other sensors 416 can also be connected to the peripherals interface 406, such as a positioning system (e.g., GPS receiver), a temperature sensor, a biometric sensor, or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and embodiment of the communication subsystem 424 can depend on the communication network(s) over which the mobile device 300 is intended to operate. For example, a mobile device 300 may include communication subsystems 424 designed to operate over a GSM network, a GPRS network, an EDGE network, a Wi-Fi or WiMax network, and a Bluetooth™ network. In particular, the wireless communication subsystems 424 may include hosting protocols such that the device 300 may be configured as a base station for other wireless devices.

An audio subsystem 426 can be coupled to a speaker 428 and a microphone 430 to facilitate voice-enabled functions, such as voice recognition, voice replication, digital recording, and telephony functions.

The I/O subsystem 440 can include a touch screen controller 442 and/or other input controller(s) 444. The touch-screen controller 442 can be coupled to a touch screen 446. The touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one embodiment, a pressing of the button for a first duration may disengage a lock of the touch screen 446; and a pressing of the button for a second duration that is longer than the first duration may turn power to the mobile device 300 on or off. The user may be able to customize a functionality of one or more of the buttons. The touch screen 446 can, for example, also be used to implement virtual or soft buttons and/or a keyboard.

In some embodiments, the mobile device 300 can present recorded audio and/or video files, such as MP3, AAC, and MPEG files. In some embodiments, the mobile device 300 can include the functionality of an MP3 player or other type of media player. Other input/output and control devices can also be used.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks. The operating system 452 may include instructions for handling basic system services and for performing hardware dependent tasks. In some embodiments, the operating system instructions 452 can be a kernel (e.g., UNIX kernel).

The memory 450 may also store communication instructions 454 to facilitate communicating with one or more additional devices, one or more computers and/or one or more servers.

The memory 450 may include graphical user interface (GUI) instructions 456 to facilitate graphic user interface processing; phone instructions 460 to facilitate phone-related processes and functions; electronic messaging instructions 462 to facilitate electronic-messaging related processes and functions; media processing instructions 466 to facilitate media processing-related processes and functions; GPS/Navigation instructions 468 to facilitate GPS and navigation-related processes and instructions; and/or camera instructions 470 to facilitate camera-related processes and functions.

The memory 450 may include property content classification instructions 480 to facilitate various embodiments described in this disclosure with respect to determining information about property content, including receiving and processing images, receiving and transmitting GPS information, receiving and transmitting information about a property, and the like.

The memory 450 may also store other software instructions (not shown), such as web video instructions to facilitate web video-related processes and functions; and/or web shopping instructions to facilitate web shopping-related processes and functions. In some embodiments, the media processing instructions 466 are divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 450 can include additional instructions or fewer instructions. Furthermore, various specialized functions of the mobile device 300, in accordance with embodiments described in this disclosure, may be implemented in hardware and/or in software, including in one or more signal processing and/or application specific integrated circuits.

According to some embodiments, processes described in this disclosure may be performed and/or implemented by and/or otherwise associated with one or more specialized processing devices (e.g., the devices of FIGS. 1-5 in this disclosure), specialized computers, specialized computer terminals, specialized computer servers, specialized computer systems, and/or specialized networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by specialized hardware, software (including microcode), firmware, or any combination of such specialized components, as described in this disclosure. For example, a storage medium (e.g., a hard disk, Universal Serial Bus (USB) mass storage device, and/or Digital Video Disk (DVD)) may store thereon instructions that when executed by a specialized machine or system described in this disclosure result in performance according to any one or more of the embodiments described in this disclosure.

Figure 5:
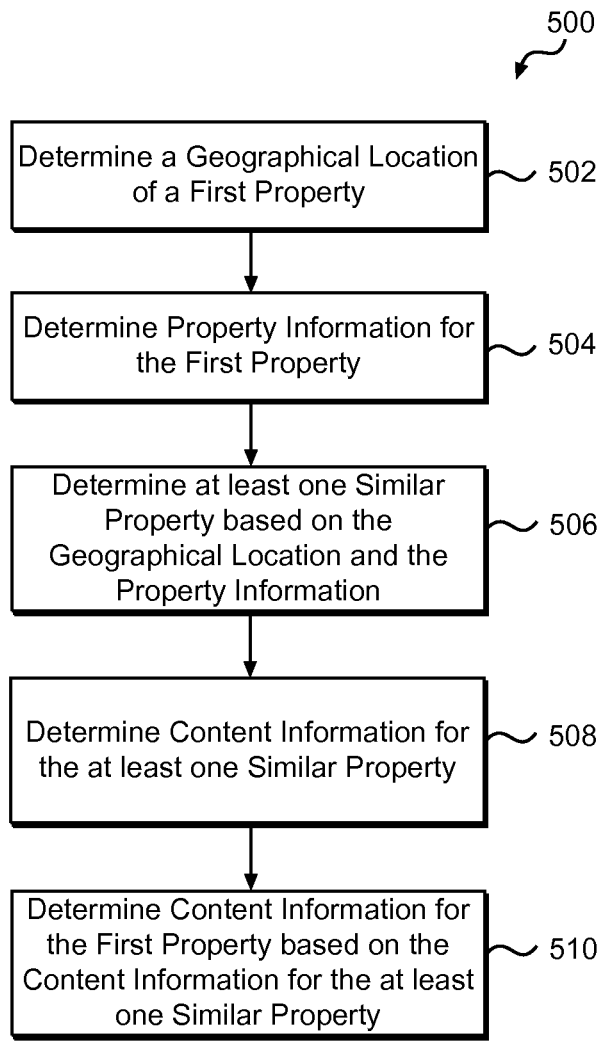
FIG. 5 is a flowchart of a method according to an embodiment of the present invention.

Referring now to FIG. 5, a flow diagram of a method 500 according to some embodiments is shown. The method 500 may be performed, for example, by a specialized server computer or specialized computerized device (e.g., mobile device 102, PCC server 106, mobile devices 246*a*, 246*b*, content classification server 202, property classification server 204, and/or property content processing system controller 206). It should be noted that although some of the steps of method 500 may be described as being performed by a server computer, for example, while other steps are described as being performed by another computing device, any and all of the steps may be performed by a single computing device which may be a mobile device, desktop computer, or another computing device, in accordance with the embodiments described in this disclosure. Further, any steps described herein as being performed by a particular computing device described in the specification may, in some embodiments, be performed by another computing device described in the specification, as deemed appropriate for a particular implementation.

According to some embodiments, the method 500 may comprise determining a geographical location of a first property, at 502, and determining property information for the first property, at 504. The method 500 may further comprise determining at least one similar property based on the geographical location and the property information, at 506.

According to some embodiments, the method 500 may comprise determining content information for the at least one similar property, at 508, and determining content information for the first property based on the content information for the at least one similar property, at 510.

As discussed with respect to various embodiments in this disclosure, the method 500 may further comprise transmitting an indication of the content information for the first property to at least one of: a mobile device and a property content application system.

In one example implementation of a method consistent with one or more embodiments of the present invention, a computerized mobile device specialized with a property content classification mobile application and comprising a communications interface may determine information about a first property (e.g., information about a type of building or other property based on user input to the computerized mobile device), determine an indication of a geographical area associated with the first property (e.g., using a GPS location service of the mobile device), and transmit, to a property content classification server (e.g., PCC server 106, property content processing system 201) via the communications interface, the information about the first property and the indication of the geographical area associated with the first property.

According to some embodiments, the method may comprise utilizing a property content classification server comprising a property classification service and property model data to determine, based on the information about the first property, the geographical area, and the property model data, a second property in the geographical area. In one embodiment, the method 500 may comprise determining property content information associated with the second property, determining property content information for the first property based on the property content information associated with the second property, and transmitting the property content information for the first property to the computerized mobile device.

According to some embodiments, determining the indication of the geographical area associated with the first property comprises receiving the indication of the geographical area from a user via a user interface of the computerized mobile device.

According to some embodiments, the information about a property may comprises one or more of the following:
 a size of the property,
 a property type of the property,
 a number of persons associated with the property (e.g., persons who work at, visit, and/or reside at the property)
 a number of objects at the property, and
 at least one type of object at the property.

As discussed with respect to various embodiments in this disclosure, the computerized mobile device may further comprise an image capture device (e.g., camera subsystem 420 of FIG. 4). Accordingly, the information about the first property may comprise at least one electronic image file, captured by the image capture device, each electronic image file including a representation of at least one object at the first property.

As discussed with respect to various embodiments in this disclosure, determining property content information associated with a second property may comprise receiving, from a database of stored property content information (e.g., object classification DB 214), the property content information associated with the second property. In one or more embodiments, the property content information associated with the second property may include one or more of: an indication of at least one type of object at the second property, and an indication of a value of at least one object at the second property.

According to some embodiments, determining (e.g., in a property content classification system) the property content information for a first property based on the property content information associated with a second property may comprise determining a classification of at least one object at the first property based on the property content information associated with the second property, wherein the classification of the at least one object at the first property comprises at least one of: an indication of at least one type of object at the first property, and an indication of a value of at least one object at the first property. In one example, classifying an object may comprise determining a type of object associated with a second, similar property near the first property, and recommending that the same type of object be associated with the first property. For instance, if a similar, nearby office building is associated with office equipment and product inventory object types, those types of objects may be recommended to associate with a first property that is also an office building. Accordingly, information about recommended and/or anticipated objects that are or may become associated with a first property may be determined.

According to some embodiments, determining the property content information for the first property based on the property content information associated with the second property may comprise determining, based on the property content information associated with the second property, an object classification for at least one object at the second property, and associating the object classification with the first property. In one example, associating a determined object classification may include associating a type of object and/or a valuation of an object with a first property. For instance, a value and/or object type associated with at least one object at the second property may be determined, and that value and/or object type may then be associated with the first property.

According to some embodiments, a property content classification system and/or an appropriately configured mobile device (e.g., executing a property content classification mobile application) may further provide for transmitting property content information determined for a first property to one or more types of property content application systems, such as, without limitation, an augmented reality application system, a virtual reality application system, an insurance policy application system, an inventory application system, and/or a mapping application system.

According to some embodiments, as discussed in this disclosure, one or more specialized functions performed in a property content classification system) may be performed by one or more components of the system. In one example, a computerized mobile device (e.g., comprising a property content classification mobile application and a communications interface) may be specially configured to perform steps to: determine information about a first property; determine an indication of a geographical area associated with the first property; and transmit (e.g., to a property content classification server and/or to a user), the information about the first property and the indication of the geographical area associated with the first property. In another example, a property content classification server (e.g., comprising a property classification service and property model data) may be specially configured to perform steps to: determine a second property in a geographical area (e.g., based on information about a first property, the geographical area, and/or property model data); determine property content information associated with the second property; determine property content information for the first property based on the property content information associated with the second property; and transmit the property content information for the first property (e.g., to a computerized mobile device and/or to a user). According to some embodiments, one or more of the functions described above with respect to a particular device may be performed by the other example device; in one embodiment, all of the functions may be performed by a single example special purpose device (e.g., by a computerized mobile device or by a property content classification server).

Figure 6:
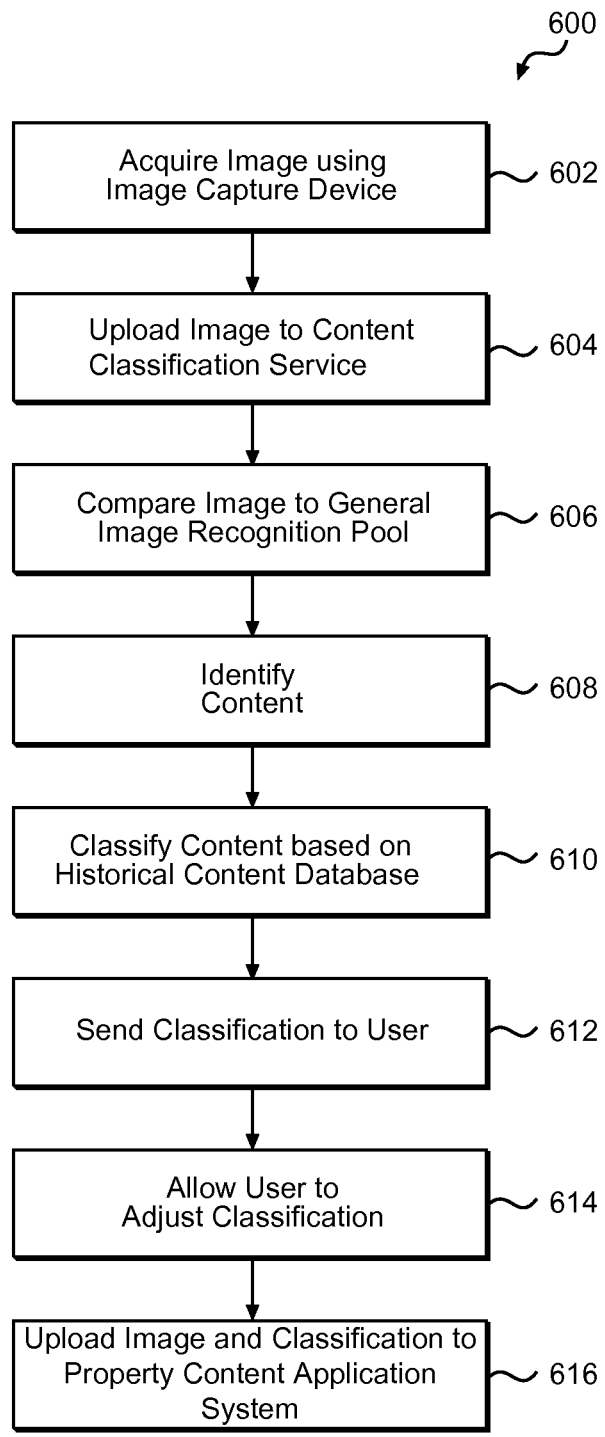
FIG. 6 is a flowchart of a method according to an embodiment of the present invention.

Referring now to FIG. 6, a flow diagram of a method 600 according to some embodiments is shown. The method 600 may be performed, for example, by a specialized server computer or specialized computerized device (e.g., mobile device 102, PCC server 106, mobile devices 246a, 246b, content classification server 202, an image recognition system, and/or property content processing system controller 206). It should be noted that although some of the steps of method 600 may be described as being performed by a server computer, for example, while other steps are described as being performed by another computing device, any and all of the steps may be performed by a single computing device which may be a mobile device, desktop computer, or another computing device, in accordance with the embodiments described in this disclosure. Further, any steps described herein as being performed by a particular computing device described in the specification may, in some embodiments, be performed by another computing device described in the specification, as deemed appropriate for a particular implementation.

According to some embodiments, the method 600 may comprise acquiring an image (e.g., embodied as an electronic image file) using an image capture device (e.g., integrated in a mobile device), at 602. In one example, a mobile device may capture an image of an object at a particular property using a camera of the mobile device. The method 600 may comprise uploading the acquired image to a content classification service, at 604. In one embodiment, the mobile device transmits (e.g., over a wireless communication network) the image to a remote content classification service (e.g., hosted by PCC server 106 or content classification server 202). The image is compared to a general image recognition pool, at 606, and content of the image is identified, at 608. In one embodiment, the content classification service processes the image to extract object data using an image recognition process. The system then compares the extracted object data with previously stored image data (e.g., image DB 212) to identify a content match. After the content is identified (e.g., a type of the object in the image is determined), the identified content is classified based on information a stored historical content database (e.g., object classification DB 214). Various types of classification information are described in this disclosure. In one example, the identified content may be classified as to a type of content (e.g., a content category) and/or as to a valuation of the content (e.g., a monetary or replacement value of an object).

An indication of a classification of the content is sent to a user (e.g., over a wireless communication network to a mobile device at a particular property), at 612. For example, an indication of a type of the identified content may be sent to a user's mobile device to display via a user interface. According to some embodiments, the method 600 may comprise allowing the user to adjust the classification of the content (e.g., via a user interface), at 614. In one example, a user may be allowed to associate the content with one or more additional or substitute categories, and/or may be able to edit a recommended valuation of the content. According to some embodiments, the method 600 may further comprise uploading the image and the classification to one or more property content application systems (e.g., property content application systems 116), at 616.

According to one embodiment, a content classification system (e.g., PCC server 106, property content processing system 201, content classification server 202) receives an electronic image file (e.g., from a mobile device) associated with a geographical area (e.g., a digital image of objects in a particular building in particular city). The content classification system identifies an object type of a first object that is represented in the electronic image file, by comparing the electronic image file to stored object image data (e.g., image DB 212) using an image recognition process (e.g., image recognition analysis instructions 208). For example, an object may be identified as a shelving unit or a specific type of vehicle. For example, the system identifies a shelving unit in the electronic image file by comparing the image data to reference image data that includes reference images of shelving units. The image recognition process thus identifies an object type of the first object by matching the object with the reference data. Various types of image recognition processing algorithms are known that may be suitable for identifying various types of objects. In one example, computer vision and machine learning software algorithms in the Open CV algorithm library compiled by Itseez provide for various types of image processing, including facial detection and recognition and object identification.

In one embodiment, object classification analysis instructions 210 may be used to conduct a second stage analysis to determine specific classification information for other like objects—objects of the same type, but not the very same object being analyzed in the electronic image file. The content classification system thus also determines at least one previously classified second object of the same object type based on stored historical object data (e.g., object classification DB 214) that includes an object type of the second object. For any previously classified second objects that are so determined, respective object classification data associated with each second object is determined (e.g., by the content classification system) based on the stored historical object data. In one example, the additional object classification information may comprise an indication of the quality, age, and/or value (e.g., sales and/or replacement value) of the second object. The image of the current object may be compared with a stored image of the second image in order to determine a potential match based on quality, age, and/or value, for example. According to some embodiments, the second (reference) object of like type is also associated with the same geographical area. For instance, an image of a photocopier at a first business location is found to match an image of a photocopier at a second business in the same city.

According to some embodiments, the content classification system determines content classification information for the first object based on the object classification data for the second object. In one example, if an associated monetary value for the second object is "HIGH" or a particular monetary value, the same value may be recommended for the first object being analyzed. In some embodiments, multiple second objects may be determined, and an average value may be determined for the first object based on the object classification data for the plurality of second objects. In some embodiments, the content classification information for the first object is transmitted (e.g., to a mobile device and/or property content application system).

Any or all the methods described in this disclosure may involve one or more interface(s). One or more of such methods may include, in some embodiments, providing an interface by and/or through which a user may determine object classification information based on localized information. Although certain types of information are illustrated in the example interfaces, those skilled in the art will understand that the interfaces may be modified in order to provide for additional types of information and/or to remove some of the illustrated types of information, as deemed desirable for a particular implementation.

Figure 7:
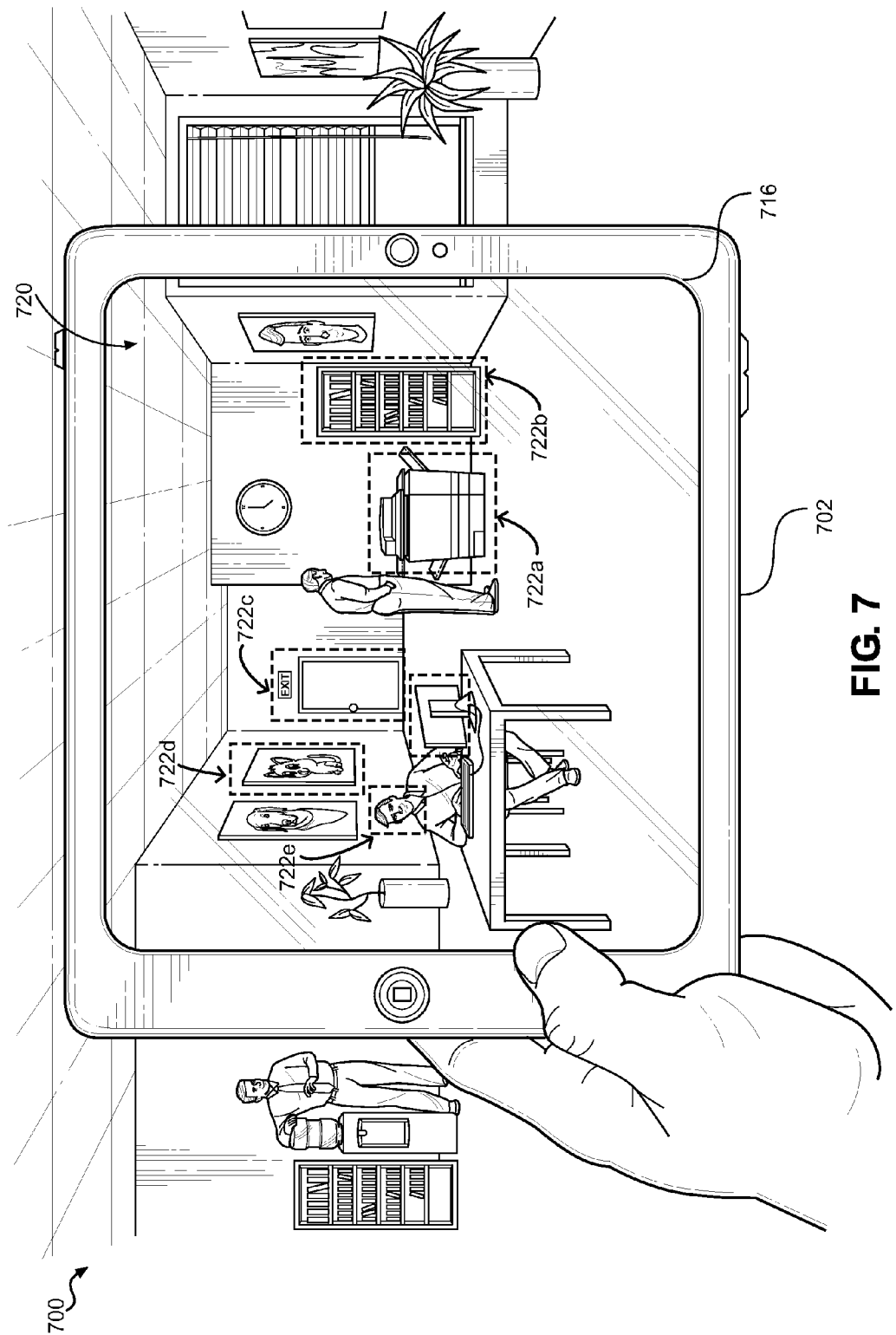
FIG. 7 is a diagram of an example system according to an embodiment of the present invention.

Referring now to FIG. 7, a perspective diagram of an example system 700 according to some embodiments is shown. In some embodiments, the system 700 may comprise mobile device 702 having a display device 716 that outputs an interface 720. The interface 720 may, for example, comprise output from a property content classification application that is programmed to enhance real-world images (previously stored and/or captured and displayed in real time) with augmented and/or supplemental content (e.g., object image highlighting 722*a-e*). As depicted, for example, the interface 720 (via the display device 716) displays an image of an office or other place of business. The mobile device 702 may, in some embodiments, comprise a camera (not shown in FIG. 7) or other image capture device that captures an image in the direction opposite of the output of the interface 720 (e.g., oriented opposite to the display device 716 that outputs the interface 720), allowing a user to utilize the mobile device 702 as a "frame" or lens through which the office (or other real-world property location) may be viewed. As depicted in FIG. 7, the interface 720 may comprise, for example, a real-time image of a property (e.g., a business office) behind the mobile device 702 as the mobile device is being held by a user. Alternatively, or in addition, the interface 720 may comprise a stored image of the property that was previously captured using the camera.

In some embodiments, the interface 720 may be augmented with data supplemental to the stored or real-time image data output via the display device 716. The interface 720 may comprise, for example, object image highlighting 722*a-e* of one or more objects in the (stored or real-time) image. As depicted, for example, the object image highlighting 722*a-e* alters the portion of the displayed image corresponding to certain content and features of the example business office. In such a manner, for example, the user's attention may be drawn to the office equipment highlighted at 722*a*, the shelving unit highlighted at 722*b* (which itself may contain product inventory, printed reference materials, or other types of objects), the door highlighted at 722*c*, the artwork highlighted at 722*d*, and the person highlighted at 722*e*. The object image highlighting 722*a-e* may comprise an indication that the highlighted object has been identified as an object for which a specific electronic image file has previously been created (e.g., and the previously stored object is recognized in the current image) and/or may comprise an indication that the highlighted object has been identified as a potential object for which an image may be captured. In some embodiments, the highlighting 722*a-e* may change color, appearance, and/or animation based on whether the corresponding object has been captured previously or not and/or whether the corresponding object has been classified or not.

Fewer or more components 702, 716, 720, 722*a-e* and/or various configurations of the depicted components 702, 716, 720, 722*a-e* may be included in the system 700 without deviating from the scope of embodiments described in this disclosure. In some embodiments, the mobile device 702 may comprise a mobile application and/or platform programmed and/or otherwise configured to execute, conduct, and/or facilitate one or more the methods described in this disclosure.

Some embodiments of the invention are described with regard to insurance applications (other uses are envisioned, and some of those other uses are also described in this application). One or more embodiments may allow an insurance professional (e.g., an insurance policy underwriter) or other type of user (e.g., a homeowner), for example, to determine more accurate valuations of personal property within a property of an insurance customer (or prospective customer) and/or to determine such personal property valuations more quickly. For example, as discussed in this disclosure, some embodiments provide a technical solution to problems in the art related to the inability of individuals, while at a property, to (i) acquire accurate information about personal property at the site and/or (ii) determine an accurate valuation of personal property based on localized information. In addressing one or more of such problems, some of the special purpose systems and methods described in this disclosure with respect to insurance (and other contexts) apply technical improvements in data collection (e.g., using cameras of mobile devices) and/or in information processing technology linked to local, geographical factors (e.g., by determining and utilizing knowledge of the valuations of like personal property in a comparable location). As noted in this disclosure, such special purpose applications may be applied with respect to a variety of different types of objects or personal property, and to corresponding types of insurance coverages, including, without limitation, automobile insurance, personal property insurance, homeowner's insurance, business personal property insurance, and the like.

Some embodiments of the present invention may be directed to a particular property (e.g., a building or other real estate) that includes persons, personal property, or both persons and personal property at a given property location. In some embodiments, object classification may comprise a valuation of personal property objects, such as may be useful, for example, in establishing insurance policy coverage (e.g., based on a determined monetary value of personal property of a residence or business).

In some embodiments, systems and methods are provided for determining a valuation of the personal property of a business (e.g., at a particular business location) and/or determining a recommendation of personal property insurance coverage based on one or more similar businesses in the same geographical area as the business. In one embodiment, an object classification system (e.g., a property content valuation system) may determine a value for business personal property based on a business classification of a business, content of the business's property, and/or a geographical location of the business. According to some embodiments, a specific type of property content valuation system (e.g., a business personal property valuation system) for calculating appropriate insurance coverage values for a business's personal property, vehicles, and/or personnel, may comprise an example mobile application that leverages location awareness to identify similar businesses in the area of a given businesses. In one embodiment, the application may capture images of a business's personnel, inventory, finished goods, equipment, and other types of personal property contents, to determine more accurate values of such objects. In one embodiment, the property content valuation system may evaluate and/or project a business's contents based on similar businesses in the same geographical region.

According to some embodiments, a personal property valuation system may provide a platform to identify a geographical location of a business or residence. In one embodiment, the system may utilize the determined geographical location to determine one or more similar businesses in the surrounding area. In one embodiment, the system may be used to determine the size of a property of a business (e.g., the size of a building or other place of business).

As discussed with respect to various embodiments in this disclosure, a property content classification system (e.g., a personal property valuation system) may use one or more mobile framework location services to identify a location of a business or other property based on the location of a mobile device. In one example, an application captures the GPS coordinates for a mobile device using native geolocation frameworks (e.g., Apple Inc.'s GPS location services for its iOS™ devices; Google Maps™ GPS location services for Android™ devices). According to one embodiment, a mobile application may determine and/or receive a full address of a property's location, including the following: street address, city, state, and ZIP code. As discussed with respect to some embodiments in this disclosure, location information may be utilized by a business classification application to identify businesses at the geographical location.

In some embodiments, a personal property valuation system may comprise at least one mobile application (stored on and/or accessible via a mobile device, as described with respect to various embodiments in this disclosure) allowing an insurance agent and an insurance customer to be on-site where personal property is located, and providing access to details about the personal property that might otherwise be unattainable.

According to some embodiments, a property content valuation system may provide a coverage rating for business or residential personal property. In one embodiment, the system may use business information, such as publicly available financial information (e.g., from companies in the same geographical location). Such financial information may comprises, for example, business data such as earnings statements, balance sheets, and/or financial statements. According to some embodiments, financial information may be collected by, distributed by, and/or received from a third-party system (e.g., financial analysis provided by Marshall & Swift/Boeckh (MSB)).

According to some embodiments, a business classification process may be used to identify at least one similar business in the geographical region based on the location information acquired by a personal property valuation system. In one embodiment, location information associated with a property may be uploaded to a web service where the business classification occurs. According to some embodiments, a business classification process may be based on the location and other business information, such as, but not limited to:
  business address (Address, City, State, ZIP code)
  annual sales
  building square footage
  industry type
  number of employees In one example implementation, a business classification process retrieves similar businesses based on a ZIP code provided in a classification request. The additional business information is matched against regional business information (e.g., acquired by a web service request to MSB). The result of a business classification process may be a subset of similar businesses in a geographical area.

According to some embodiments, determining coverage levels may comprise determining one or more of various categories of personal property, such as:
  total content coverage
  raw materials
  finished goods
  computers
  miscellaneous
  equipment
  furniture
  vehicles According to some embodiments, a property content valuation system may provide recommended values for personal property insurance coverage (e.g., based on similar businesses), and may provide an agent or customer the ability to override, cancel, and/or modify the recommended values for customized coverage (e.g., via a user interface of a mobile device executing a mobile application). In one embodiment, a property content valuation process averages the results from the regional business data (e.g., business personal property values may be averaged across a plurality of categories.

In one embodiment, valuations for personal property may be presented in dollar amounts and sent to a customer as the recommended coverage limits for the customer's personal property. In one embodiment, a customer may continue to capture additional business personal property inventory information (e.g., using a user interface) to further refine the coverage.

According to some embodiments, a personal property valuation system may comprise an inventory image capture providing a way for an insurance company to verify personal property stated on an insurance policy. The image capture capability allows the customer to capture further detail regarding the business personal property. In one embodiment, a mobile application may provide a thumbnail view of images of property contents images and/or a mobile device may store images during an image capture process. In one embodiment, each captured image may be cataloged and supplemented with a short description, a timestamp, and/or geographical location information. In some embodiments, a mobile application may provide for submitting images to a system for image classification.

For example, image capture functionality may be made available through a mobile device platform. In one embodiment, an application may allow a customer to capture pictures of personal property and upload the images to a valuation system. In some embodiments, images of inventory may be stored in association with insurance policy information. In some embodiments, a personal property valuation system may use stored images to determine the quality of the personal property (e.g., for which coverage is sought), and/or to determine what level of coverage is comparable for the items.

According to some embodiments, a property content valuation system may provide an enhanced rating of personal property by reviewing a set of images of inventory of a property (e.g., business inventory). In one embodiment, the system may use image recognition to match captured images of personal property inventory with existing stock images associated with known insurance coverage levels.

According to some embodiments, an image classification system may comprise a two-stage system including an object recognition portion and a content classification portion. The first stage of the image classification may be used to identify an object represented in an image. Recognizable images may include, without limitation, one or more of:

Shelving Unit
Televisions
Cash Registers
Boxes of Inventory
Furniture
Building Fixtures A second stage of object classification may comprise a lookup to find similar objects having a known insurance coverage value. In one embodiment, the known coverage value of objects may be determined from historical classification of other personal property contents. In this way, an unidentified "shelving unit," for example, may be classified on a monetary scale based on other "shelving units" insured by an insurance carrier.

In one embodiment, the system may provide for an ability to override, cancel, and/or modify a range of coverage based on image recognition. In one example, various coverage levels may be ordered in a range of predetermined available coverage levels (e.g., "LOW", "MEDIUM", "HIGH"). In one embodiment, each level is associated with a respective coverage limit associated with a particular personal property item.

According to some embodiments, a property content valuation system may comprise an interface with an insurance policy application system, for example, to upload the personal property analysis conducted through a mobile application. In one example, the interface may further provide the ability to modify an existing insurance policy, or create a new insurance policy quote, based on the personal property valuation. In one embodiment, an upload process may interact automatically with a work management system to alert an insurance professional that a customer is interested in coverage for business or residential personal property.

FIGS. 8-13 depict respective example user interfaces 800, 900, 1000, 1100, 1200, 1300, according to some embodiments. In some embodiments, a mobile device may comprise a display device that outputs on or more of the user interfaces 800, 900, 1000, 1100, 1200, 1300. As depicted in user interface 800, an example mobile application called "Property Content Manager" presents "Detail Information" about a particular property (an example business called "ABC Restaurant"). The user interface 800 includes example information about the property, including a property name, industry type, annual sales, number (#) of employees, and an indication of a size of the property ("Building Sq Ft"). According to some embodiments, a user may input, review, and/or modify the property information via the user interface 800, such as, by example and without limitation, touching an editable field and typing information into the application using a hardware or software keyboard, or audio input device. As discussed with respect to some embodiments described in this disclosure, information about a property (e.g., business information about a business) may be used in classifying a property, determining one or more similar properties (e.g., similar businesses in the same geographical area), and/or classifying one or more objects of a property.

Figure 9:
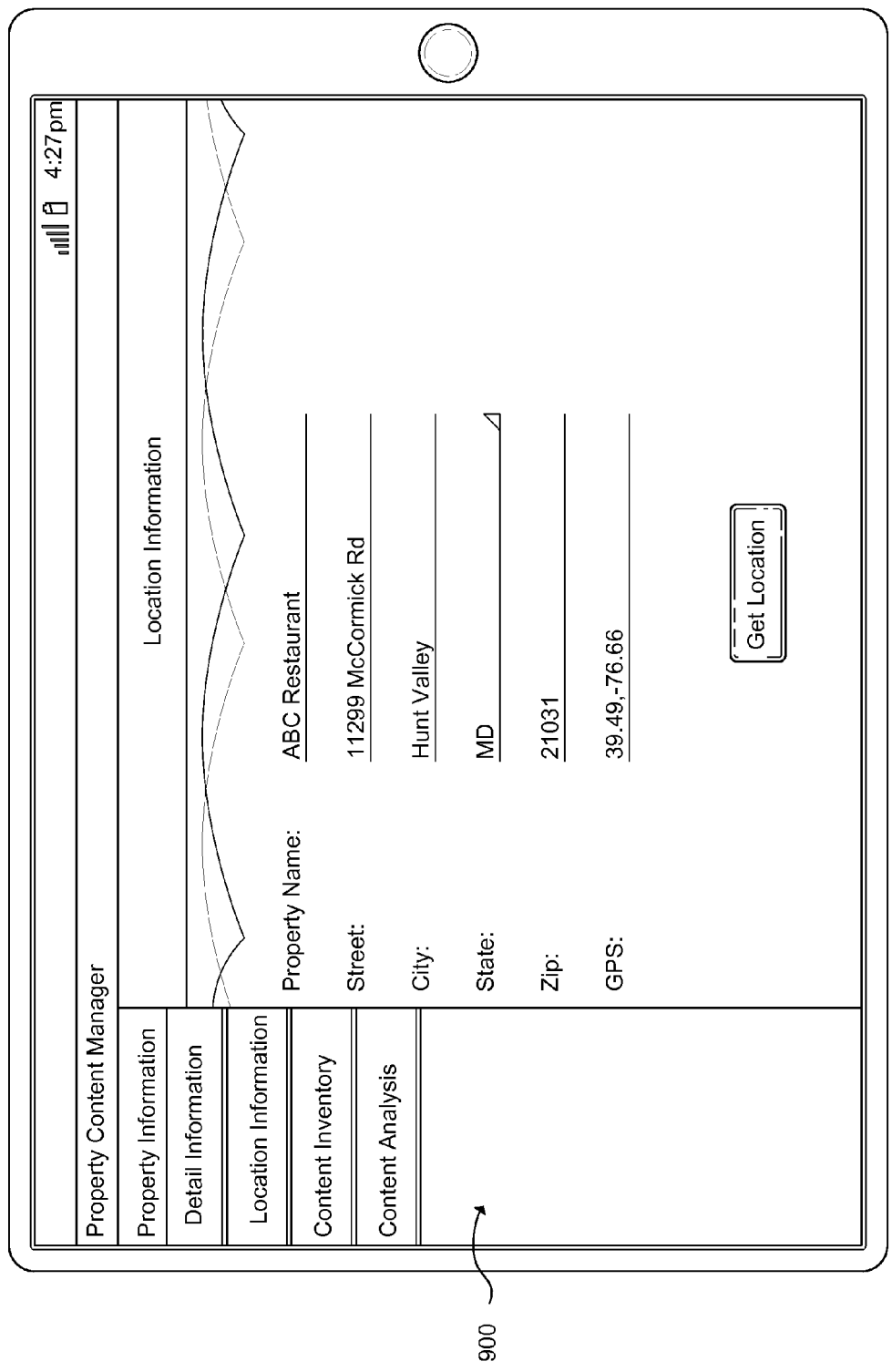
FIG. 9 is a diagram of an example user interface according to an embodiment of the present invention.

As depicted in user interface 900 of FIG. 9, the example "Property Content Manager" mobile application presents "Location Information" associated with the particular example "ABC Restaurant" property. The user interface 900 includes example information about the location, including a street, city, state, ZIP code, and GPS coordinates. According to some embodiments a map interface may be presented for depicting location information associated with a particular property. According to some embodiments, a user may input, review, and/or modify the location information via the user interface 900, as described above with respect to example user interface 800. According to some embodiments, some or all of the location information may be determined using a location service and/or GPS receiver. According to some embodiments, location information may be determined automatically by a mobile application. In one embodiment, a user may request a new or refreshed location of the mobile device (e.g., by actuating the example interface "Get Location" button). As discussed with respect to some embodiments described in this disclosure, location information associated with a property (e.g., a geographical location of a business) may be used in classifying a property, determining one or more similar properties (e.g., similar businesses in the same geographical area), and/or classifying one or more objects of a property (e.g., based on similar objects in the same geographical area).

Figure 8:
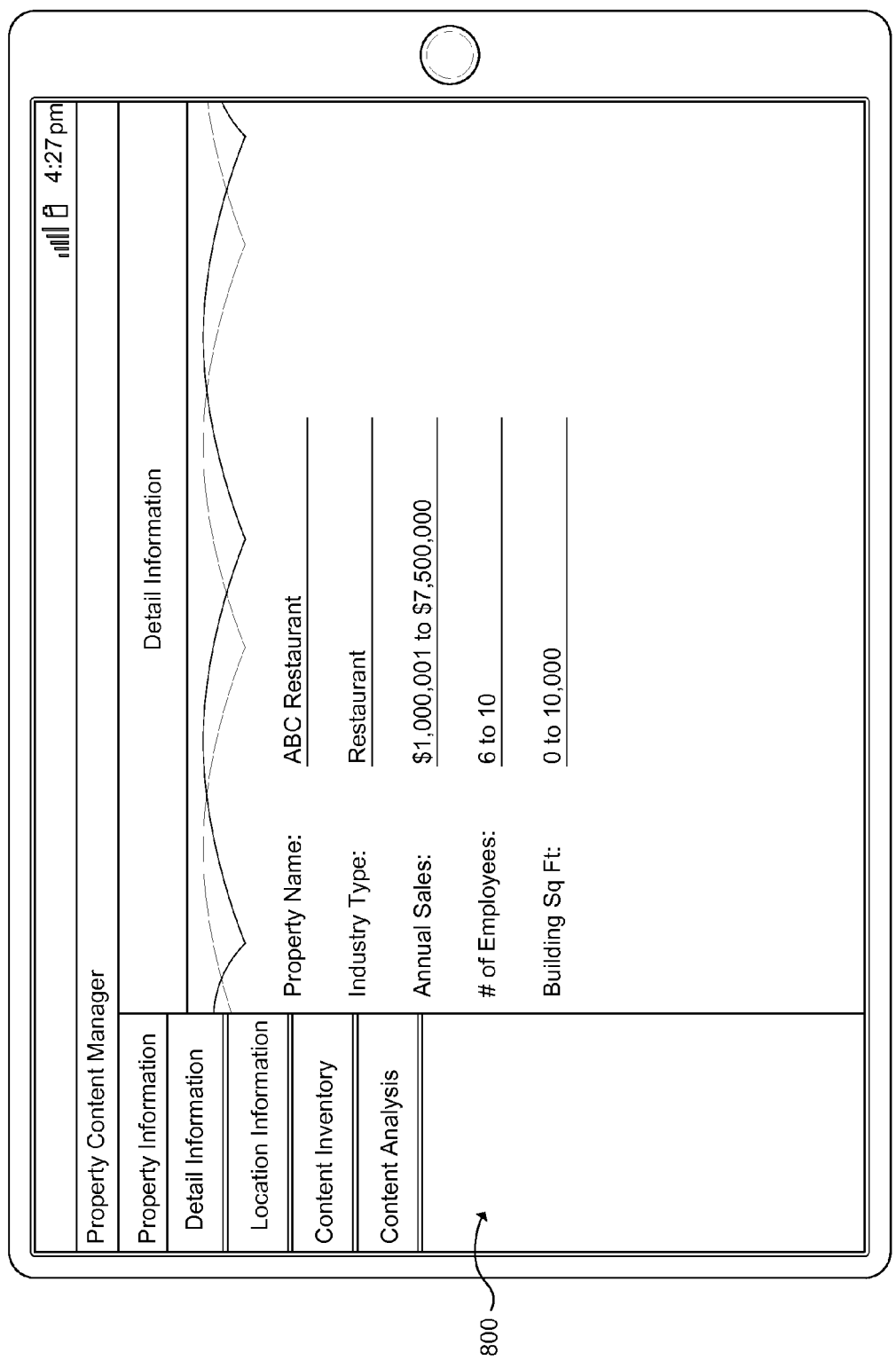
FIG. 8 is a diagram of an example user interface according to an embodiment of the present invention.
Figure 10:
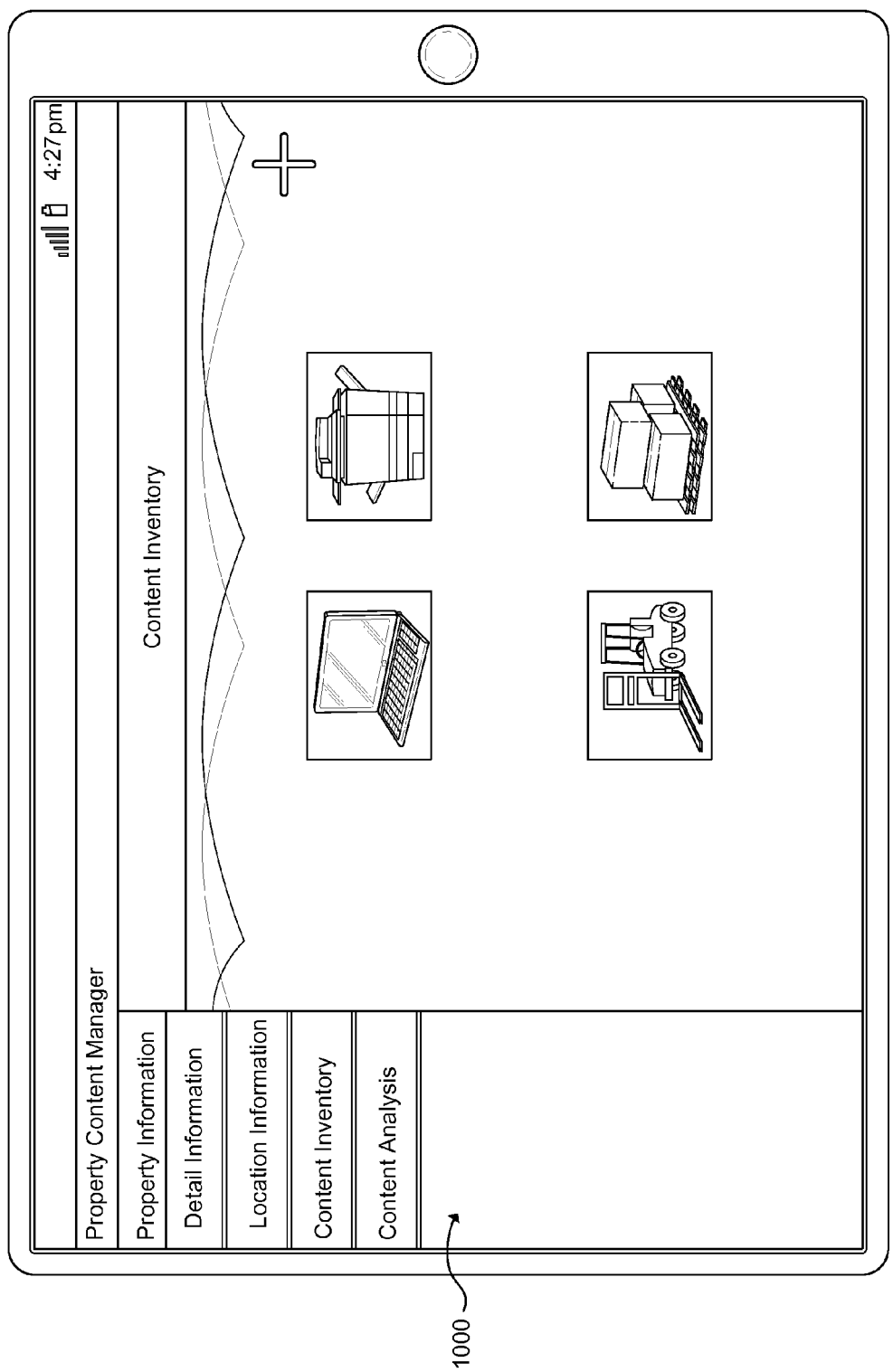
FIG. 10 is a diagram of an example user interface according to an embodiment of the present invention.
Figure 11:
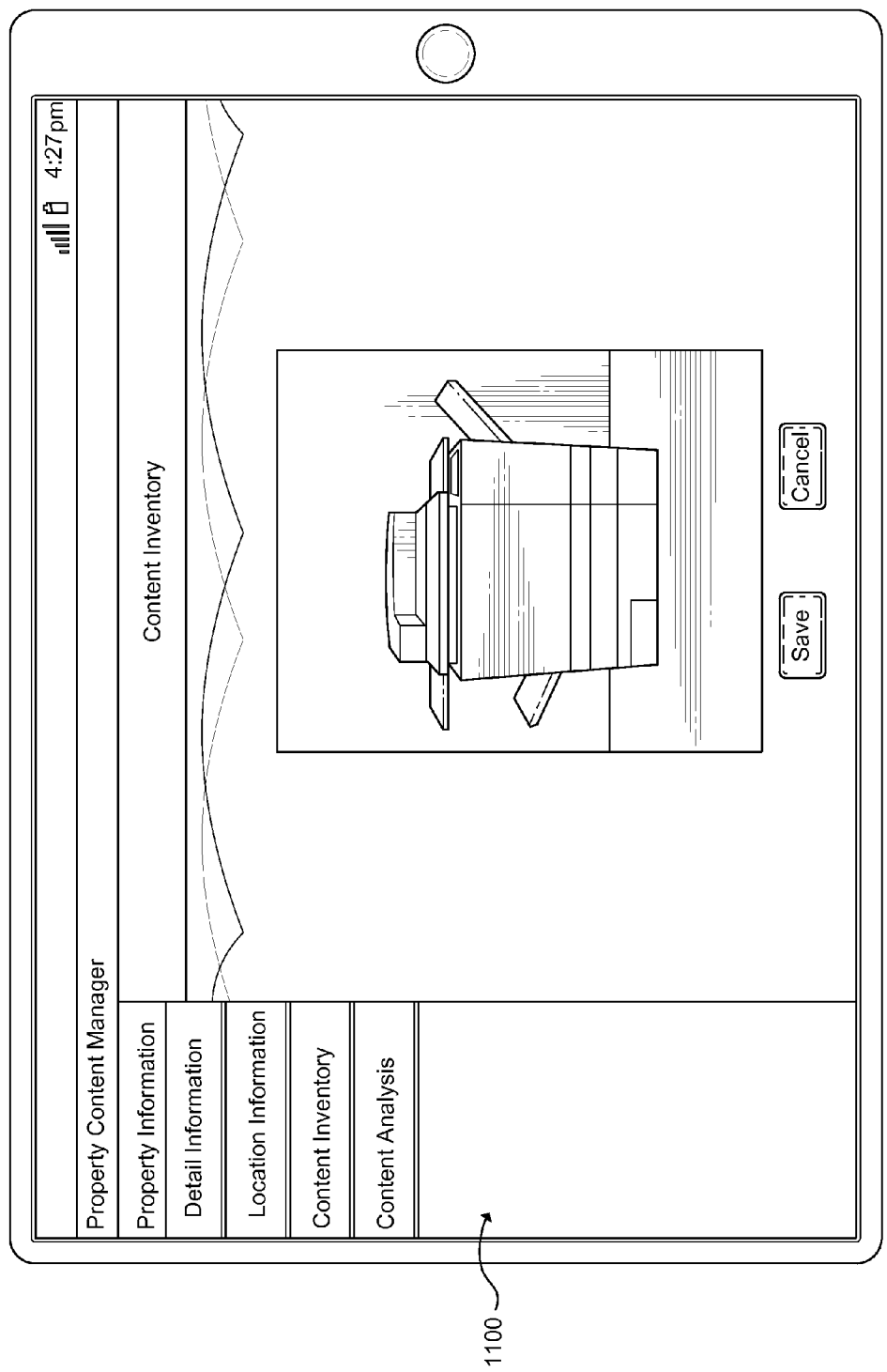
FIG. 11 is a diagram of an example user interface according to an embodiment of the present invention.
Figure 12:
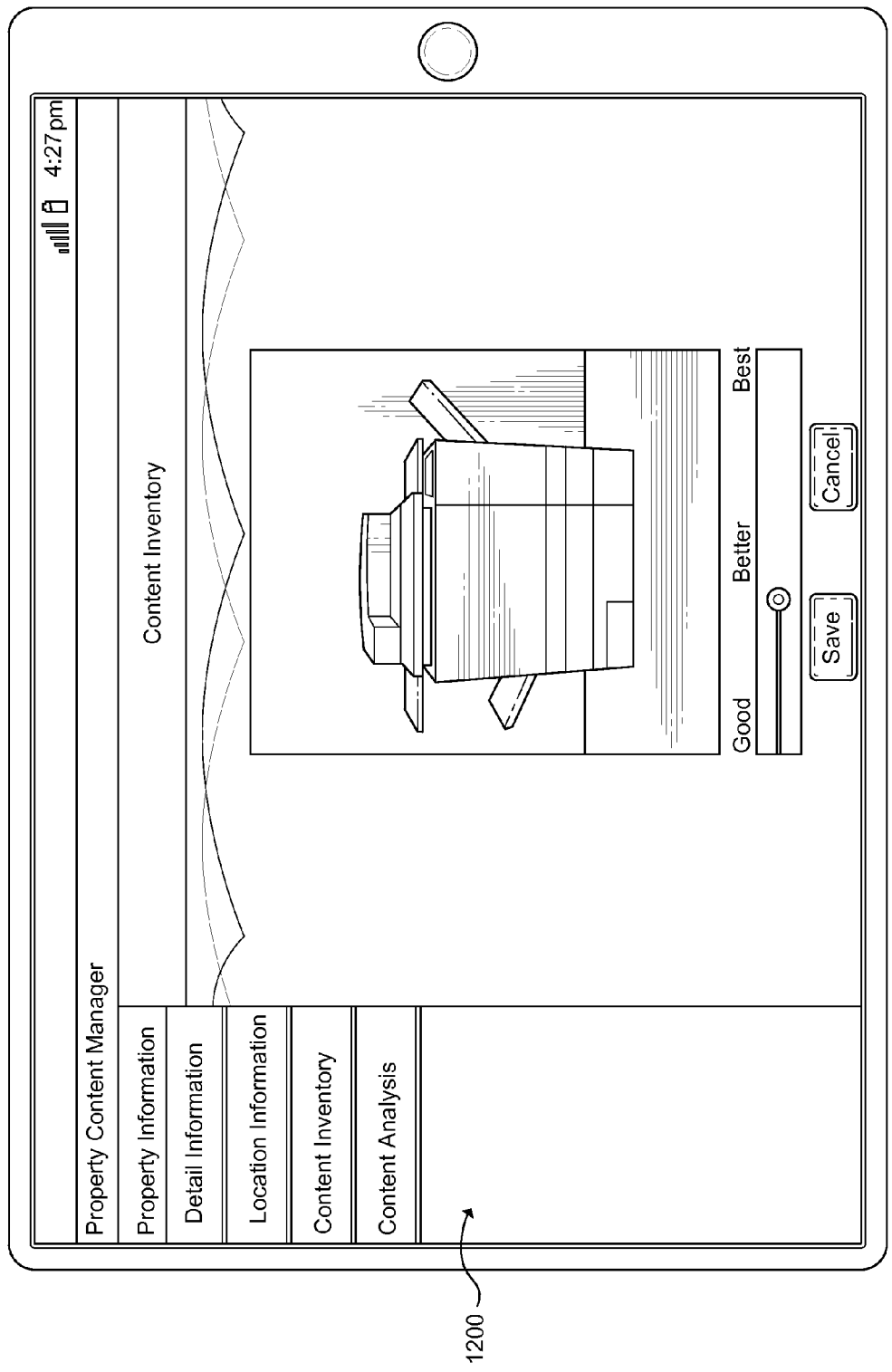
FIG. 12 is a diagram of an example user interface according to an embodiment of the present invention.

As depicted in user interface 1000 of FIG. 10, the example "Property Content Manager" mobile application presents "Content Inventory" associated with a particular property (e.g., "ABC Restaurant" of FIG. 8). The user interface 1000 includes example images (e.g., thumbnail versions of larger stored image files) of contents of the particular property. In one example, the depicted laptop, office copying machine, forklift, and boxes of inventory objects may comprise business personal property associated with a business or other type of property. According to some embodiments, a user may input, delete, review, and/or modify the stored images represented by the thumbnail images via the user interface 1000. In some embodiments, as depicted in example user interface 1100 of FIG. 11, selecting a depicted image may cause the example mobile application to present a larger image of the depicted object and/or to present additional information (e.g., image metadata) associated with the object (e.g., a description, a geographical location, a timestamp, type of image capture device used to capture the object image). In some embodiments, as depicted in example user interface 1200 of FIG. 12, selecting a depicted image may cause the example mobile application to allow a user to select or modify a particular coverage level for one or more types of objects. For example, using the example slider of the user interface 1200, a user may select a desired coverage level of "Better" for the depicted office copier machine (and/or for all office equipment).

Referring again to user interface 1000 of FIG. 10, according to some embodiments, a user may initiate a process to add a new object image, for example, by selecting a corresponding user interface object (the example "+" interface object). Adding a new object image may involve invoking a native or application-specific camera application and/or presenting one or more forms or other input means for receiving additional information about the image from a user (e.g., the user can input an image description via the user interface). As discussed with respect to some embodiments described in this disclosure, electronic image files of objects at a property (e.g., images of business personal property of a business) may be used to identify the objects (e.g., using an image recognition process), classify the objects (e.g., determine a type and/or value of the objects), and/or determine a coverage limit corresponding to the objects.

Figure 13:
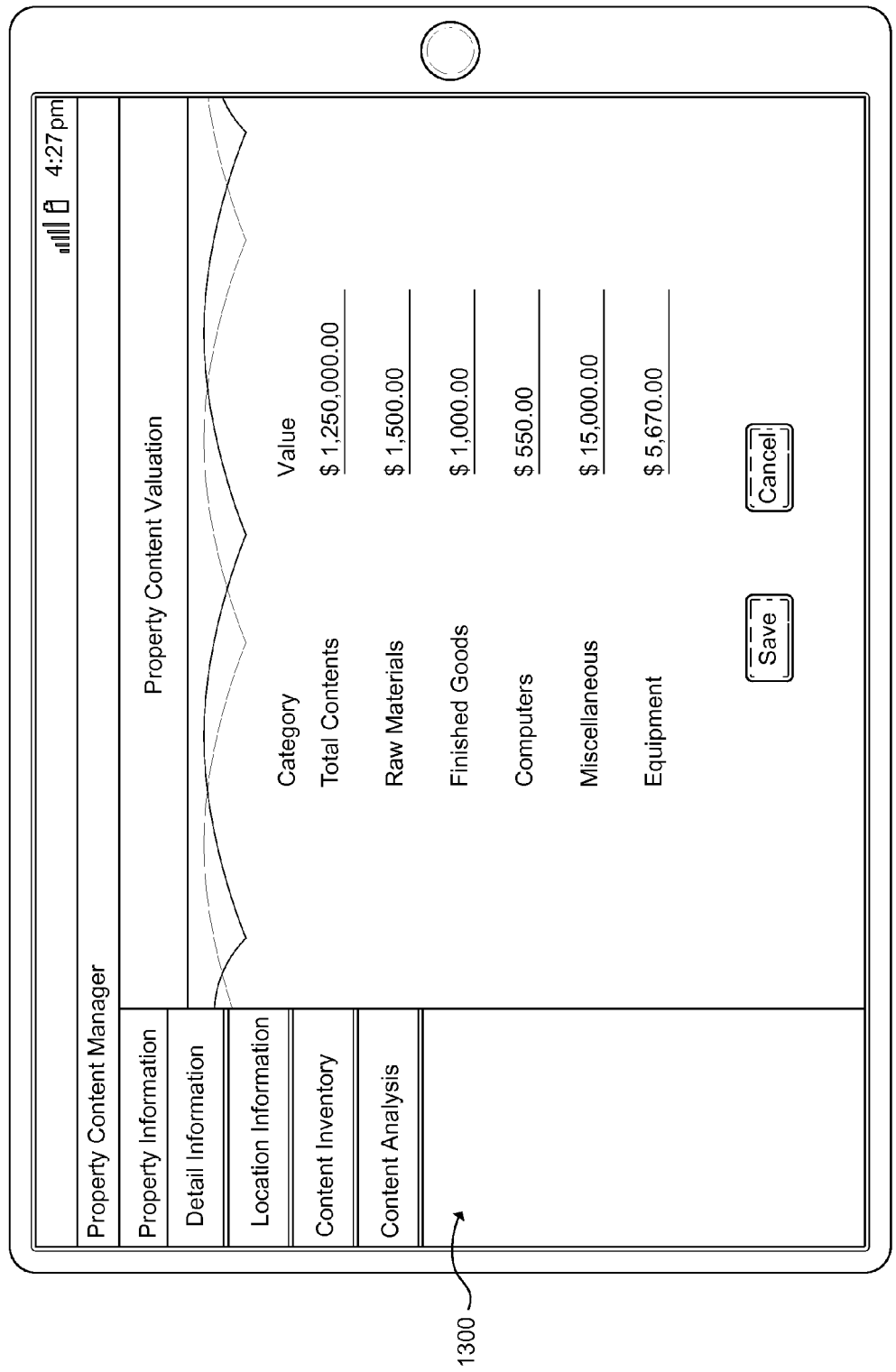
FIG. 13 is a diagram of an example user interface according to an embodiment of the present invention.

Referring to example user interface 1300 of FIG. 13, the example "Property Content Manager" mobile application presents "Property Content Valuation" information associated with the particular example "ABC Restaurant" property. As discussed with respect to various embodiments described in this disclosure, object classification information may be determined with respect to one or more of various categories of content. In the depicted example, the object classification information includes object types (or personal property categories) and respective valuation information for each object type. As discussed with respect to various embodiments described in this disclosure, property content valuation may be determined for a property (e.g., a business customer at a particular location) based on information about the property, the geographical location of the property, business information associated with the property, a classification of the property, one or more similar properties (e.g., in the same geographical area), the contents of the property, and/or images of objects (e.g., personal property) at the property. In the example depicted in FIG. 13, the user interface 1300 is providing examples of respective recommended (and/or entered) insurance coverage levels for each depicted type of personal property (e.g., "Total Contents", "Raw Materials", "Finished Goods", "Computers", "Miscellaneous", "Equipment"). As discussed with respect to some embodiments, the property content classification information may be saved at the mobile device and/or transmitted to a property content application system (e.g., an insurance policy application system).

According to some embodiments, the valuation of personal property at a property (e.g., at a business location or residence) for purposes of recommending or establishing insurance coverage limits may also or alternatively comprise one or more actions associated with insurance premium calculation (e.g., which may be part of an insurance underwriting process). Premium calculation may be determined by a "pricing engine" to calculate (and/or look-up or otherwise determine) an appropriate premium to charge for an insurance policy associated with the property and/or objects for which the property content valuation was performed. In some embodiments, the property and/or objects analyzed may comprise a business, residence, and/or personal property for which an insurance product is sought (e.g., the analyzed property may comprise property for which a property insurance policy is desired, or a business for which business insurance is desired).

According to some embodiments, a method may also or alternatively comprise one or more actions associated with insurance policy quote and/or issuance. Once a policy has been rated, priced, or quoted (e.g., for a particular business) and the client has accepted the coverage terms, the insurance company may, for example, bind and issue the policy by hard copy and/or electronically to the client/insured. In some embodiments, the quoted and/or issued policy may comprise a personal insurance policy, such as a property damage and/or liability policy, and/or a business insurance policy, such as a business liability policy, and/or a property damage policy.

Interpretation

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The phrase "based on" does not mean "based only on", unless expressly specified otherwise. In other words, the phrase "based on" describes both "based only on" and "based at least on".

As used in this disclosure, a "user" may generally refer to any individual and/or entity that operates a user device.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather may include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., specially-configured and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated among a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system for enhancing displayed real-time images of objects with augmented content on a mobile device, the system comprising:
    a computerized mobile device comprising:
        a processor,
        a display device in communication with the processor,
        a geolocation system in communication with the processor,
        an image capture device in communication with the processor,
        a wireless communications interface in communication with the processor, and
        a computer-readable memory in communication with the processor, the computer-readable memory storing a property content classification mobile application that when executed by the processor directs the processor to:
            determine, using the geolocation system, a location of a first property;
            determine property information associated with the first property;
            transmit, using the wireless communications interface, the location of the first property and the property information to a property content classification server;
            receive, from the property content classification server, content information for at least one similar property;
            receive, via the image capture device, a real-time image captured at the first property, the real-time image including at least one object;
            display, using the display device, the real-time image;
            augment the displayed real-time image using the display device to generate a user interface, the user interface including object image highlighting of at least one object represented in the real-time image;
            transmit an electronic image file including a representation of the at least one object to the property content classification server;
            receive, from the property content classification server, content classification information; and
            determine property content information for the first property based on the content information for the at least one similar property and the content classification information;
    and
    the property content classification server, comprising:
        a second processor;
        a second computer-readable memory in communication with the second processor, the second computer-readable memory storing instructions that when executed by the second processor direct the second processor to:
            receive, from the computerized mobile device, the location of the first property and the property information;
            identify, based on the location of the first property and the property information, the at least one similar property;
            determine the content information for the at least one similar property;
            transmit the content information for the at least one similar property to the mobile device;
            receive, from the mobile device, the electronic image file;
            recognize, using an image recognition application, the at least one object represented in the electronic image file;
            for each at least one recognized object, determine respective content classification information; and transmit the content classification information to the mobile device.

2. The system of claim 1, wherein the displayed real-time image is augmented with data supplemental to the at least one object represented in the real-time image.

3. The system of claim 1, wherein the object image highlighting alters a portion of the user interface corresponding to the at least one object represented in the displayed real-time image.

4. The system of claim 1, wherein the object image highlighting presents an indication that a highlighted object displayed using the user interface has been identified as an object for which a specific electronic image file has previously been created.

5. The system of claim 1, wherein the object image highlighting presents an indication that a highlighted object displayed using the user interface has been identified as a potential object for which an image may be captured.

6. The system of claim 1, wherein the object image highlighting presents an indication of a first type if a corresponding highlighted object has been captured previously, and presents an indication of a second type if the corresponding highlighted object has not been captured previously.

7. The system of claim 1, wherein the object image highlighting presents an indication of a first type if a corresponding highlighted object has been classified previously, and presents an indication of a second type if the corresponding highlighted object has not been classified previously.

8. The system of claim 1, wherein the instructions of the property content classification server when executed by the second processor further direct the second processor to:
identify a respective object type of each of the at least one object represented in the electronic image file, by comparing the electronic image file to stored object image data using the image recognition application.

9. The system of claim 1, wherein the at least one object comprises one of:
a shelving unit,
an electronic appliance,
a cash register,
a finished product,
product inventory,
a vehicle,
an office appliance, and
a building fixture.

10. The system of claim 1, wherein the instructions of the property content classification server when executed by the second processor further direct the second processor to:
generate a map of the first property based on the respective content classification information for each at least one recognized object.

11. The system of claim 1, wherein the instructions of the property content classification server when executed by the second processor further direct the second processor to:
transmit the content classification information to a mapping application system for generating a map of the property.

12. The system of claim 1, wherein the instructions of the property content classification server when executed by the second processor further direct the second processor to:
analyze a security status of the at least one recognized object represented in the electronic image file based on the respective content classification information.

13. The system of claim 1, wherein the instructions of the property content classification server when executed by the second processor further direct the second processor to:
transmit the content classification information to a security application system for analyzing a security status of the at least one recognized object represented in the electronic image file.

14. A mobile device providing enhanced displayed real-time images of objects with augmented content, the mobile device comprising:
a processor,
a display device in communication with the processor,
a geolocation system in communication with the processor,
an image capture device in communication with the processor,
a wireless communications interface in communication with the processor, and
a computer-readable memory in communication with the processor, the computer-readable memory storing a property content classification mobile application that when executed by the processor directs the processor to:
determine, using the geolocation system, a location of a first property;
determine property information associated with the first property;
transmit, using the wireless communications interface, the location of the first property and the property information to a property content classification server;
receive, from the property content classification server, content information for at least one similar property;
receive, via the image capture device, a real-time image captured at the first property, the real-time image including at least one object;
display, using the display device, the real-time image;
augment the displayed real-time image using the display device to generate a user interface, the user interface including object image highlighting of at least one object represented in the real-time image;
transmit an electronic image file including a representation of the at least one object to the property content classification server;
receive, from the property content classification server, content classification information; and
determine property content information for the first property based on the content information for the at least one similar property and the content classification information.

15. The mobile device of claim 14, wherein the displayed real-time image is augmented with data supplemental to the at least one object represented in the real-time image.

16. The mobile device of claim 14, wherein the object image highlighting presents an indication that a highlighted object displayed using the user interface has been identified as an object for which a specific electronic image file has previously been created.

17. The mobile device of claim 14, wherein the object image highlighting presents an indication that a highlighted object displayed using the user interface has been identified as a potential object for which an image may be captured.

18. The mobile device of claim 14, wherein the object image highlighting presents an indication of a first type if a corresponding highlighted object has been captured previously, and presents an indication of a second type if the corresponding highlighted object has not been captured previously.

19. The mobile device of claim 14, wherein the object image highlighting presents an indication of a first type if a corresponding highlighted object has been classified previously, and presents an indication of a second type if the corresponding highlighted object has not been classified previously.

20. The system of claim 1, wherein the object image highlighting comprises a representation of a line around an object represented in the displayed real-time image.

21. The system of claim 1, wherein the object image highlighting comprises highlighting around an object represented in the displayed real-time image.

22. The system of claim 1, wherein augmenting the displayed real-time image using the display device to generate a user interface, the user interface including object image highlighting of at least one object represented in the real-time image, comprises:
   using the display device to generate the user interface to display the object image highlighting of the at least one object in combination with the displayed real-time image.

23. The mobile device of claim 14, wherein the object image highlighting alters a portion of the user interface corresponding to the at least one object represented in the displayed real-time image.

24. A mobile device providing enhanced displayed real-time images of objects with augmented content, the mobile device comprising:
   a processor,
   a display device in communication with the processor,
   a geolocation system in communication with the processor,
   an image capture device in communication with the processor,
   a wireless communications interface in communication with the processor, and
   a computer-readable memory in communication with the processor, the computer-readable memory storing a property content classification mobile application that when executed by the processor directs the processor to:
   determine, using the geolocation system, a location of a first property;
   determine property information associated with the first property;
   transmit, using the wireless communications interface, the location of the first property and the property information to a property content classification server;
   receive, from the property content classification server, content information for at least one similar property;
   receive, via the image capture device, a real-time image captured at the first property, the real-time image including at least one object;
   display, using the display device, the real-time image;
   augment the displayed real-time image using the display device to generate a user interface, the user interface including object image highlighting of at least one object represented in the real-time image;
   transmit an electronic image file including a representation of the at least one object to the property content classification server;
   receive, from the property content classification server, content classification information; and
   determine property content information for the first property based on the content information for the at least one similar property and the content classification information,
   wherein the object image highlighting comprises a representation of a line around an object represented in the displayed real-time image.

25. The mobile device of claim 14, wherein the object image highlighting comprises highlighting around an object represented in the displayed real-time image.

26. The mobile device of claim 14, wherein augmenting the displayed real-time image using the display device to generate a user interface, the user interface including object image highlighting of at least one object represented in the real-time image, comprises:
   using the display device to generate the user interface to display the object image highlighting of the at least one object in combination with the displayed real-time image.

* * * * *